United States Patent Office 3,043,340
Patented July 10, 1962

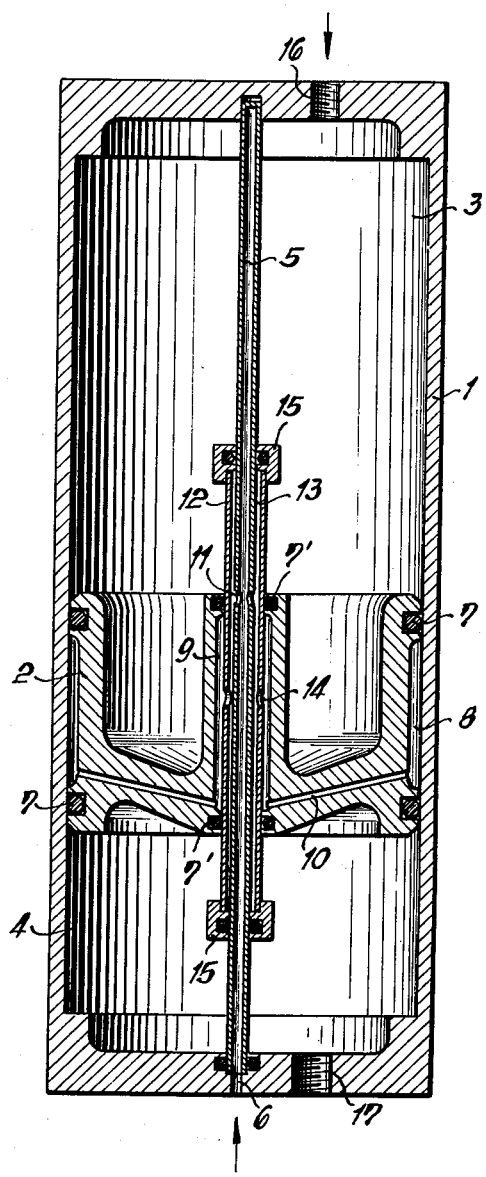

3,043,340
PISTON-OPERATED PRESSURE RESERVOIR
Herbert Rehbock, Mainz, Germany, assignor to Cadillac-Jordan G.m.b.H., Mainz-Mombach, Germany, a firm
Filed May 16, 1961, Ser. No. 110,475
2 Claims. (Cl. 138—31)

This invention relates to a piston-operated pressure reservoir. In the known pressure reservoirs a piston is arranged as a partition between a gas chamber and a pressure fluid chamber, and two O-shaped sealing rings are provided to seal the piston against the cylinder of the pressure reservoir. Furthermore, it has been suggested to improve the sealing effect by additional groove rings or thrust rings.

It is already known, in order to obtain an efficient sealing effect in working cylinders without leakage losses, to make the space between the two O-shaped sealing rings communicate with the outside air through the intermediary of a conduit, whereby under the action of lateral pressure the O-shape of the sealing rings is changed into a D-shape. As a result, the surfaces of the sealing rings bearing against the inner wall of the cylinder are considerably enlarged, depending on the pressure up to 70 to 80 percent of the diameter.

It is the object of the present invention to obtain such sealing conditions also in piston-operated pressure reservoirs.

The invention provides a piston-operated pressure reservoir which comprises a reservoir cylinder, a piston movable in the cylinder and dividing it into a chamber for a gas to be compressed and a chamber for a pressure fluid, an air inlet tube extending through the cylinder from end face to end face and fixed thereto and communicating at at least one of its extremities with the outside air, a first pair of O-shaped axially spaced sealing rings and an annular recess provided in the outer jacket of the piston, a second pair of O-shaped axially spaced sealing rings and an annular recess provided in the hub of the piston, channels provided in the piston and connecting said annular recesses, and bores provided in the air inlet tube so as to allow outside air to be fed to the annular recess in the hub of the piston and through the channels to the annular recess in the outer jacket of the piston.

In pressure reservoirs having reservoir cylinders and pistons of great over-all length a sliding tube system consisting of one, two or more additional tubes is employed for feeding the outside air. An improved sealing effect of the sealing rings is thus obtained without noticeably reducing the volume of the reservoir cylinder.

A preferred embodiment of the invention will now be described by way of example and with reference to the accompanying drawing in which the only FIGURE is a central longitudinal section through a piston-operated pressure reservoir according to the invention.

The drawing shows a reservoir cylinder 1 which is divided by a movable piston 2 into a chamber 3 for a gas to be compressed, such as nitrogen and the like, and a chamber 4 for a pressure fluid, preferably oil.

The gas to be compressed is fed to the chamber 3 through an inlet port 16 which has a filling valve (not shown) and is provided in one end face of the reservoir cylinder 1. The pressure fluid is forced to the chamber 4 through an inlet port 17 which is provided in the opposite end face of the reservoir cylinder 1.

A central air inlet tube 5 extends through the cylinder 1 from end face to end face and is fixed thereto. The air inlet tube 5 communicates at one extremity with the outside air as is shown at 6. It is, however, self-evident that also the other extremity of the air inlet tube 5 may be open. Between pairs of O-shaped axially spaced sealing rings 7 and 7¹ the outer jacket of the piston 2 as well as its hub is provided with annular recesses 8 and 9 which are interconnected by channels 10. In the zone of the hub the air inlet tube 5 is provided with bores 11 through which the outside air is fed to the annular recess 9 and, through the channels 10, to the annular recess 8 thereby to obtain a reliable sealing effect without it being necessary to change the outer dimensions and provide for additional installation space as was the case in the hitherto used types.

The loss in reservoir volume of the chambers 3 and 4 amounts to only about 1% since the tube 5 is of small diameter. For reservoir cylinders and pistons having a great over-all length, a sliding tube system with one, two or more additional tubes becomes necessary. Therefore, as shown in the figure, a sliding tube 12 is slipped over the fixed air inlet tube 5 so as to leave an annular free space 13 between the sliding tube and the air inlet tube 5, which free space 13 communicates with the annular recess 9 through perforations 14 provided in the sliding tube 12, and with the annular recess 8 through the channels 10. The ends of the sliding tube 12 are mounted in bearings 15 which are arranged to move with the sliding tube 12 and provided with the necessary sealing means.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A piston-operated pressure reservoir comprising a reservoir cylinder, a piston movable in the cylinder and dividing it into a chamber for a gas to be compressed and a chamber for a pressure fluid, an air inlet tube extending through the cylinder from end face to end face and fixed thereto and communicating at at least one of its extremities with the outside air, a first pair of O-shaped axially spaced sealing rings and an annular recess provided in the outer jacket of the piston, a second pair of O-shaped axially spaced sealing rings and an annular recess provided in the hub of the piston, channels provided in the piston and connecting said annular recesses, and bores provided in the air inlet tube so as to allow outside air to be fed to the annular recess in the hub of the piston and through the channels to the annular recess in the outer jacket of the piston.

2. A piston-operated pressure reservoir as claimed in claim 1, wherein the reservoir cylinder as well as the piston is of great over-all length which necessitates the employment of a sliding tube system comprising at least one sliding tube slipped over the fixed air inlet tube and sealed at its ends against said air inlet tube so as to leave an annular free space between the sliding tube and the air inlet tube, perforations provided in the sliding tube to feed the outside air to the annular recess in the piston hub and from there, through the channels, to the annular recess in the piston jacket.

References Cited in the file of this patent
UNITED STATES PATENTS

| | | |
|---|---|---|
| 2,729,244 | Alaska et al. | Jan. 3, 1956 |
| 2,817,361 | Mercier | Dec. 24, 1957 |
| 2,873,763 | Mercier | Feb. 17, 1959 |
| 2,876,799 | Mercier | Mar. 10, 1959 |
| 2,880,746 | Bemotas | Apr. 7, 1959 |